United States Patent Office 3,524,783
Patented Aug. 18, 1970

3,524,783
METHOD AND APPARATUS FOR HEAT-SEALING AND CUTTING THERMOPLASTIC FILMS
Donald Sutherland, Toronto, Ontario, Canada, assignor to E. S. & A. Robinson (Canada) Limited, Toronto, Ontario, Canada
Filed Apr. 16, 1968, Ser. No. 721,749
Claims priority, application Canada, Feb. 27, 1968, 013,448
Int. Cl. B32b 31/18
U.S. Cl. 156—251                                       16 Claims

ABSTRACT OF THE DISCLOSURE

An apparatus and method for preventing the deposit of charred materials in the heat sealing of thermoplastic films wherein a foil is interposed between the heat seal and the hot knife used for sealing. After a heat seal operation the foil, which has a melting point above the temperature of the hot knife, is moved at least one knife width thereby carrying any material picked off the surface of the thermoplastic film away from the hot knife so that it cannot char and so that a clean foil surface is presented for successive operations of the knife.

---

This invention relates to a method and device for heat sealing and cut off of thermoplastic films and laminates. More particularly, it relates to the prevention of charred products of the heat sealing from contaminating subsequent heat seals.

Thermoplastic films such as polyethylene and polypropylene are frequently used to make bags for packaging food, clothing and many other articles. The popularity of such bags may be attributed to such factors as economy, strength, appearance and transparency.

While these bags have many desirable properties, they have some significant disadvantages. The gas barrier of polyethylene and polypropylene bags is poor and inadequate for many end uses. Virtually the same criticism can be made of the oil barrier of both these films, and they are therefore seldom used on oily or greasy products.

One way to dramatically improve both the oil barrier and the gas barrier of these films is to coat them with a thin layer of polyvinylidene chloride (PVDC). Bags made from web so coated have a greatly extended usage where oil and gas barrier are important. While PVDC film can be used by itself to give excellent barrier, it is much too limp for efficient handling on a bag machine. Practically then, PVDC finds its most logical use as a coating on conventional bag films rather than as an unsupported bag film.

A favoured way of making such bags is to start with a roll of film and by drawing the film over a former, fold it so as to make a double layer of film, with the fold about the centre of the web, and running in the machine direction. This double layer of film is then fed through a reciprocating hot knife sealing and cut off mechanism that forms a thin seal on the trailing edge of the finished bag, cuts it free from the main sheet of web and at the same time forms a seal on the advancing edge of the web (Schjeldahl, Canadian Pats. Nos. 621,549 and 646,868). A significant advantage of this method of manufacture is that the seal is very narrow, of the order of 1/16″ wide, so that the maximum amount of film is available to enclose the product.

The disadvantage encountered when PVDC is used on polyolefin film for "Schjeldahl" type bags is that the PVDC "picks off" on the hot sealing knife, where it rapidly chars. This charred material tends to deposit back into subsequent seals thereby spoiling the appearance of the finished bag. Such bags, by reason of their unattractive appearance, are commercially unusuable for all but of few packaging requirements.

Similar problems of charring are also encountered with certain other thermoplastic films and laminates such as nylon/polyethylene laminates and even with plain polyvinyl chloride film and nylon film. Charring is therefore an important factor in limiting the usefulness of many heat sealable films.

It is therefore an object of the present invention to provide a process of heat sealing and cutting thermoplastic films which eliminates the problem of char material contaminating heat seals.

It is another object of the present invention to provide a device for use in heat sealing and cutting thermoplastic films which ensures that char material is removed from the vicinity of the cutting knife thereby preventing contamination of succeeding cuts.

It has been found that the objects of the present invention can be achieved by interposing a thin film or foil having a melting point in excess of the knife temperature between the hot knife and the film or laminate to be sealed. After sealing, the foil is moved at least the width of one seal thereby carrying away any "pick up" material which could cause char and presenting a clean surface for successive operations of the knife.

The invention will now be described in greater detail with reference to the drawings which are not to be construed in a limiting sense and in which.

Figure 1:
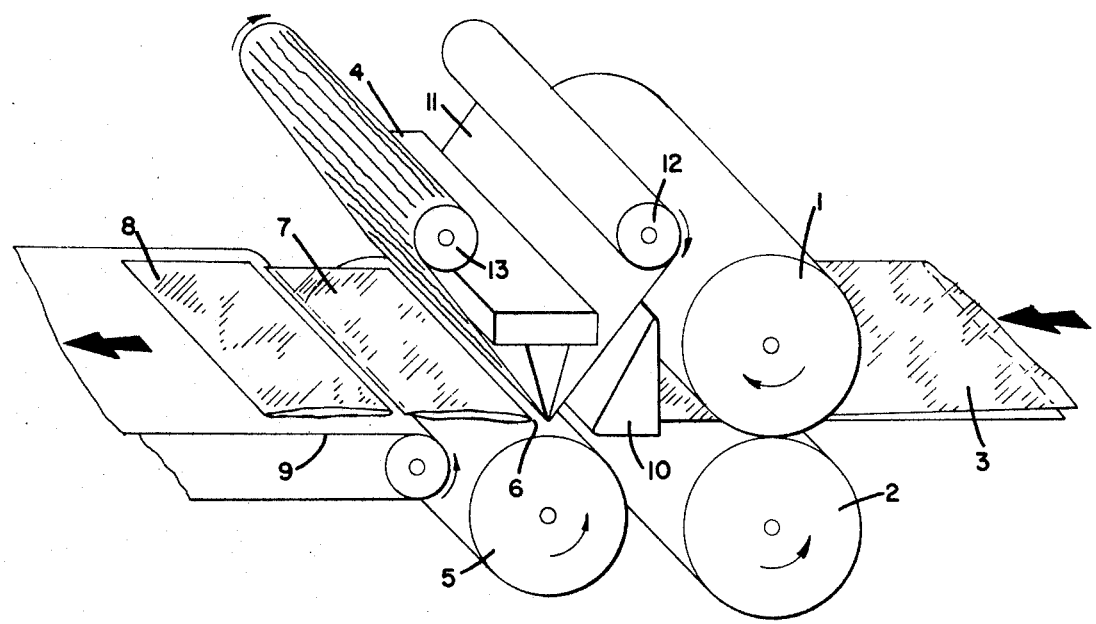
FIG. 1 is a sketch representing a sealing and cutting device according to one embodiment of the present invention and FIG. 2 is a sketch representing a sealing and cutting device according to an alternative embodiment of the invention.

Turning first to FIG. 1 which shows, in semi-digrammatic form, one form of the heating and sealing device, 1 and 2 represent draw rolls through which the folded web 3 of the polyethylene film coated with PVDC is drawn. Vertically reciprocating hot knife 4 cooperates with a polytetrafluoroethylene (sold under the trademark "Teflon") coated anvil roll 5 to seal the trailing edge 6 of a bag 7 and sever trailing edge 6 from the leading edge of the succeeding bag. Completed bags 8 are carried away on a conveyor belt system 9 for packing and shipment. In order to prevent overheating of rolls 1 and 2 and to keep the web 3 as cool as possible, a cooling tank is placed between the hot knife 4 and the roll 1 in cooling relationship with the web 3. If the apparatus were operated as herein described using PVDC laminated films the knife 4 would quickly become coated with small pieces of PVDC picked off the laminate. As the temperature of the knife is in the order of 800° F. in order to provide sufficient heat to melt and heat seal the the underlying polyethylene film, the PVDC rapidly chars as its char temperature is of the order of 500–600° F., and on the next operation the char material is at least partially deposited in the heat seal. In order to prevent contamination of the heat seals with char materials a metal foil 11 is fed from a feed roll 12 around the knife 4 to a take-up roll 13 by any conventional moving device (not shown). Typically, an aluminum foil is employed although other material having suitable high temperature stability, thermal conductivity and reasonable cost could be employed. The foil may be very thin, for example .002–.00025″ thick, and is preferably .001–.0005″ thick so that the cutting action is not impeded. On the other hand the foil must not be so thin that it breaks when the cutting pressure is applied. After a sealing and cutting operation the foil is advanced so that the "pick-up" material is removed from the vicinity of the hot knife and cannot, therefore, char. In some instances it is necessary to advance the foil 11 after each cutting operation and in others it may only be necessary to advance the foil after a number of operations.

Figure 2:
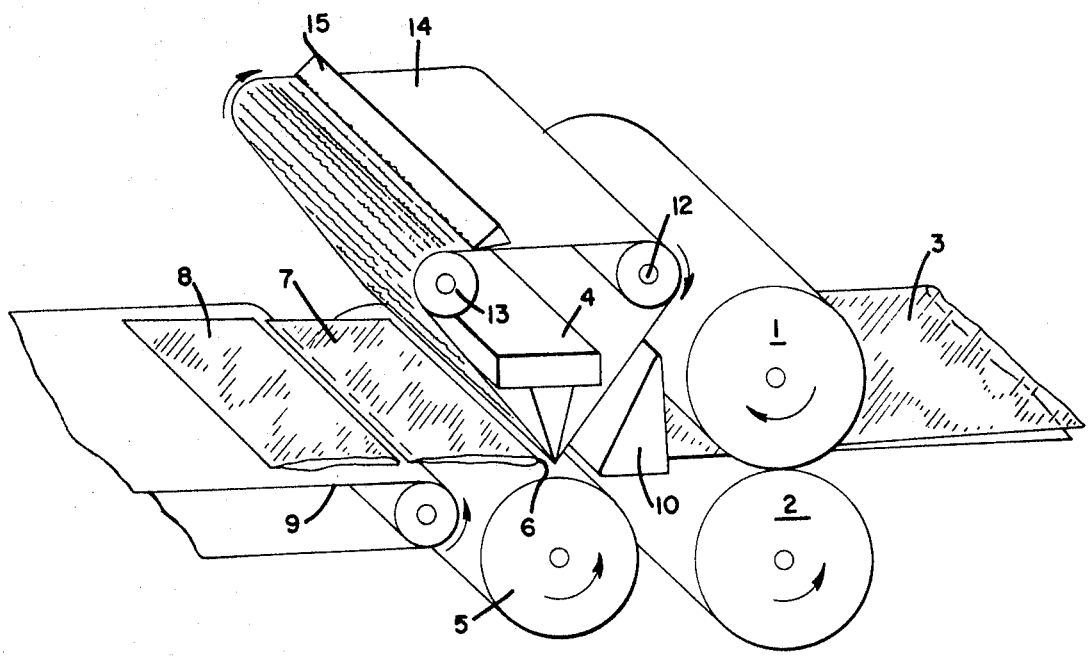

As the width of the seal is approximately 1/16" and the bag may be up to about 30" wide and, depending on the size of machine, up to about 4 feet long or even longer, the ratio of foil used, either advanced with every operation or at intervals, to the value of the bag produced is usually so favourable that the spent foil may be scrapped. Alternatively, the foil could be cleaned and reused. FIG. 2 shows an arrangement whereby an endless belt 14 of a foil material is employed. A scraper 15 or other cleaning device is provided to remove the "pick-up" material so that a clean foil surface is presented for the sealing and cutting operation. If an endless belt system is employed it is clear that the rolls 12 and 13 merely act as tensioning and directional devices and in all other respects the device is unchanged from the embodiment of FIG. 1. When an endless belt is employed, a slightly heavier and more durable foil may be employed, with the proviso that it is not so thick that heat transfer is lost or the cutting edge is dulled to the extent that it will not perform its proper function.

Figure 3:
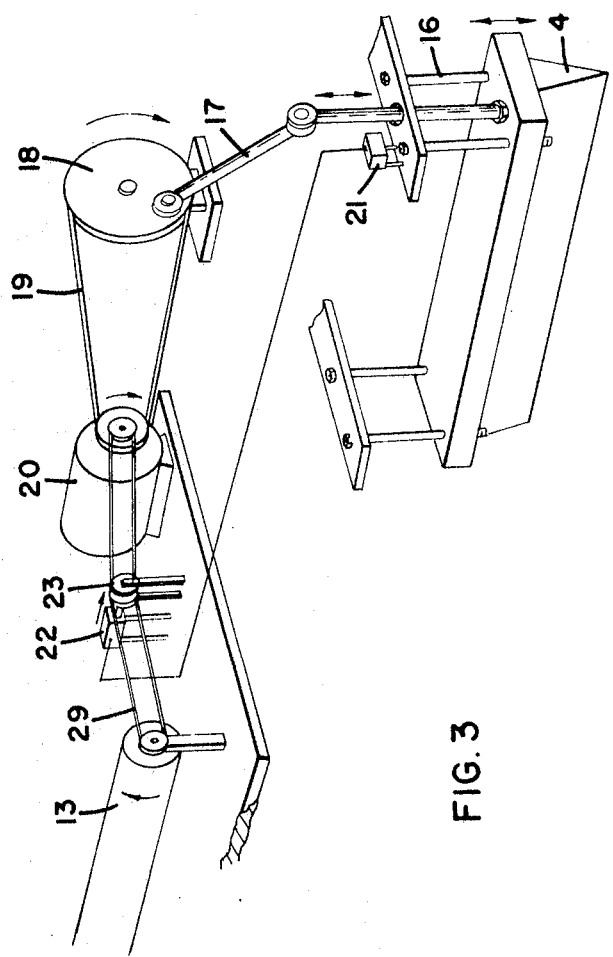
FIG. 3 is a sketch showing one embodiment of the moving mechanism employed in the present invention.

Many devices of moving the foil 11 relative to the cutting edge 4 can of course be used. FIG. 3 shows one such device, and must not be construed in a limiting sense. The cutting edge 4 reciprocates in slides 16 by means of a crank 17 attached to a rotating disc 18. Disc 18 is driven by a belt 19 from a motor 20. As the edge 4 reciprocates a counter 21 is tripped and after a selected number of operations, counter 21 actuates a solenoid 22 which throws a clutch 23 on a shaft 24 attached to motor 20. Shaft 24 is caused to rotate and through a gear or belt mechanism 25, take up roll 13 is rotated for a selected period, thereby advancing the foil 11 by a selected amount. Clearly other methods can be employed such as a simple timing device, camming devices and the like.

Still further embodiments will suggest themselves to those skilled in the art such as employing rolls as in FIG. 1 and reversing the rolls after complete passage of a length of foil to present the unused side to the thermoplastic laminate or employing a foil in the form of sheets that reciprocates between the knife edge and a cleaning station. The foil could even be in the form of a narrow ribbon moving in the direction of the long dimension of the knife edge.

Although the foregoing discussion has been directed to bag making, there are many other applications for the novel process and device which fall within the scope of the present invention. The device may be used to produce many kinds of inflatable items such as toys and advertising novelties and other instances where it is desired to heat seal layers of thermoplastic materials.

I claim:
1. In a method of heat sealing and cutting a plurality of super-imposed thermoplastic films passing along a defined path during which passage said films are periodically contacted with a heated sealing and cutting edge, the improvement comprising passing a flexible, resilient foil of high thermal conductivity which is infusible at the temperature of said edge between said films and said edge, the movement of said foil relative to said edge being responsive to the reciprocation of said edge whereby to remove pick-up material produced during said sealing and cutting of said films and thus provide a clean sealing and cutting edge for subsequent sealing and cutting of said films.

2. A method as claimed in claim 1 wherein said foil is moved after each successive sealing and cutting of said films.

3. A method as claimed in claim 1 wherein said foil is advanced at least one seal width.

4. A method as claimed in claim 1 wherein said films are laminates.

5. A method as claimed in claim 4 wherein said laminate is polyethylene film coated with a layer of polyvinylidene chloride.

6. In an apparatus for heat sealing and cutting a plurality of superimposed thermoplastic films comprising means to advance said films along a defined path, sealing and cutting means adapted to reciprocate between a position remote from said path and a sealing and cutting position in which it seals and cuts said films in said path, and means to heat said sealing and cutting means, the improvement comprising: a flexible, resilient foil of high thermal conductivity which is infusible at the operating temperature of said sealing and cutting means arranged to pass between said sealing and cutting means and said film in said path, and means to move said foil relative to said sealing and cutting means when said sealing and cutting means is out of said cutting and sealing position.

7. An apparatus as claimed in claim 6 wherein said foil is a metal foil.

8. An apparatus as claimed in claim 6 wherein said foil is an aluminum foil.

9. An apparatus as claimed in claim 6 wherein said means to move said foil is adapted to operate after each successive reciprocation of said sealing and cutting means.

10. An apparatus as claimed in claim 6 including a feed roll adjacent one side of said sealing and cutting means to store new foil and a take up roll adjacent an opposed side of said sealing and cutting means to collect soiled foil.

11. An apparatus as claimed in claim 6 wherein said foil is moved in a direction parallel to the direction of movement of said film.

12. An apparatus as claimed in claim 6 wherein said foil is moved in a direction perpendicular to the direction of movement of said film.

13. An apparatus as claimed in claim 6 including a polytetrafluoroethylene covered roll cooperating with said sealing and cutting means on the side of said film remote from said sealing and cutting means.

14. An apparatus as claimed in claim 6 including cooling means adjacent the feed side of said sealing and cutting means.

15. An apparatus as claimed in claim 6 wherein said foil is an endless strip.

16. An apparatus as claimed in claim 15 including a cleaning means associated with said endless strip.

References Cited

UNITED STATES PATENTS 3,257,256  6/1966  Lehmacher et al. __ 156—515 X
3,384,528  5/1968  Lehmacher et al. ____ 156—515

VERLIN R. PENDEGRASS, Primary Examiner

U.S. Cl. X.R.

156—515